(12) United States Patent
Dietmeier

(10) Patent No.: US 7,963,169 B2
(45) Date of Patent: Jun. 21, 2011

(54) LEVEL INDICATOR OR PRESSURE-MEASURING DEVICE WITH A CUP-SHAPED HOUSING COVER

(75) Inventor: Juergen Dietmeier, Hausach (DE)

(73) Assignee: Vega Grieshaber KG, Wolfach (DE)

( * ) Notice: Subject to any disclaimer, the term of this patent is extended or adjusted under 35 U.S.C. 154(b) by 5 days.

(21) Appl. No.: 12/379,029

(22) Filed: Feb. 11, 2009

(65) Prior Publication Data

US 2009/0241661 A1    Oct. 1, 2009

Related U.S. Application Data

(60) Provisional application No. 61/064,852, filed on Mar. 31, 2008.

(30) Foreign Application Priority Data

Mar. 31, 2008  (EP) .................................. 08 006 229

(51) Int. Cl.
    *G01L 7/00* (2006.01)
(52) U.S. Cl. ........................................................ 73/700
(58) Field of Classification Search .................. None
    See application file for complete search history.

(56) References Cited

U.S. PATENT DOCUMENTS

| 3,434,330 | A | * | 3/1969 | Ingham et al. ................. 73/1.88 |
| 4,154,116 | A |   | 5/1979 | Stahn et al. |
| 4,175,444 | A |   | 11/1979 | Harland |
| 4,753,112 | A |   | 6/1988 | Wetterhorn et al. |
| 6,168,566 | B1 | * | 1/2001 | Lia et al. ........................ 600/488 |
| 6,820,490 | B2 | * | 11/2004 | Mittelstein et al. ............. 73/715 |
| 7,164,262 | B2 | * | 1/2007 | Zacay .............................. 324/115 |
| 2006/0293600 | A1 |   | 12/2006 | Wawro et al. |

FOREIGN PATENT DOCUMENTS

| DE | 28 23 034 A1 | 11/1979 |
| DE | 100 61 893 A1 | 6/2002 |
| GB | 731967 | 6/1955 |

OTHER PUBLICATIONS

Office Action, CN 2008 1018 8620.7, issued on Dec. 21, 2010.

* cited by examiner

*Primary Examiner* — Andre J Allen
(74) *Attorney, Agent, or Firm* — The Nath Law Group; Jerald L. Meyer; Derek Richmond

(57) ABSTRACT

Level indicator or pressure-measuring device with a cup-shaped housing cover (1), having a cylindrical lateral wall (10) and an inspection glass (4) fixed to the base, such that the inspection glass (4) is held in place by a bayonet fitting.

13 Claims, 3 Drawing Sheets

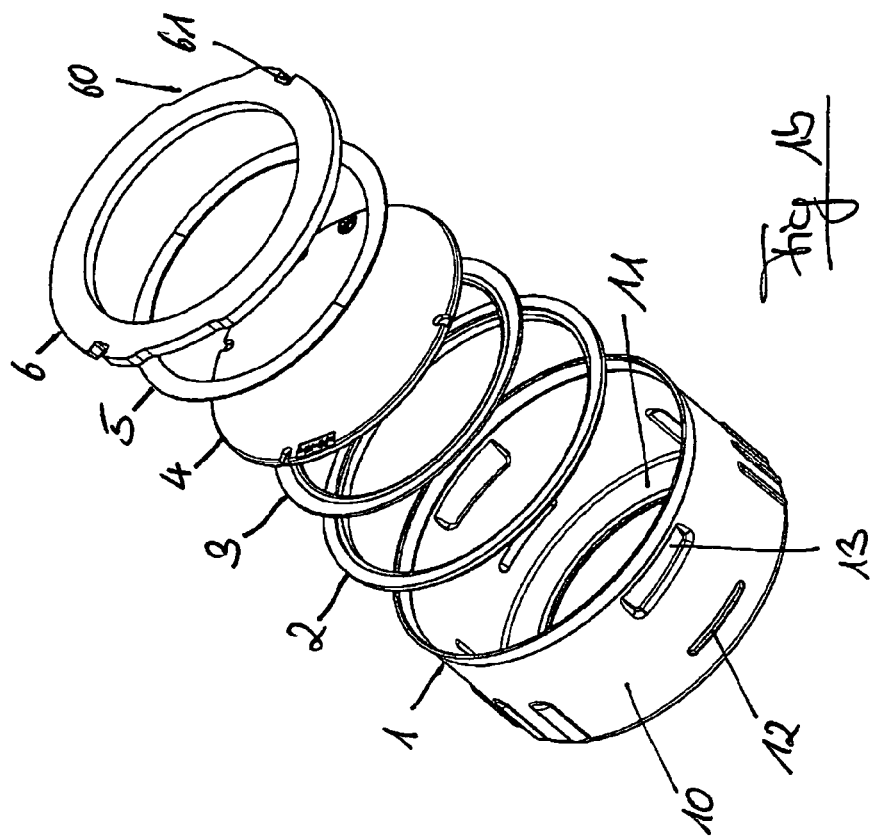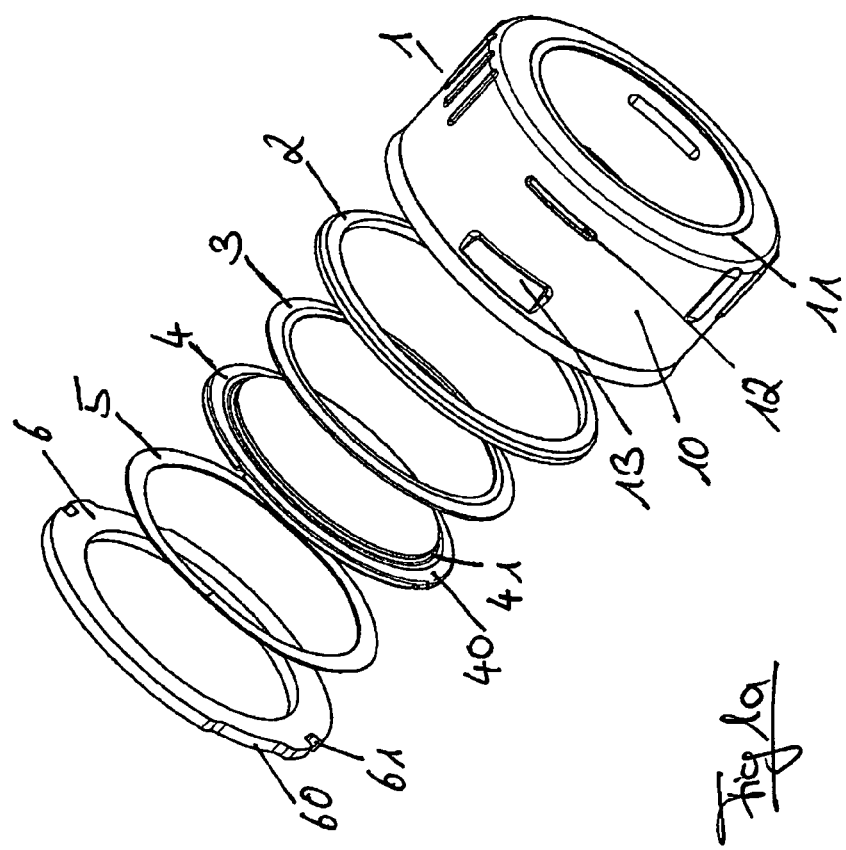

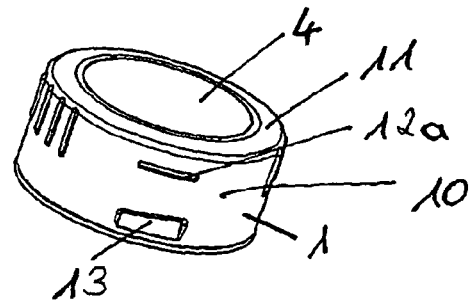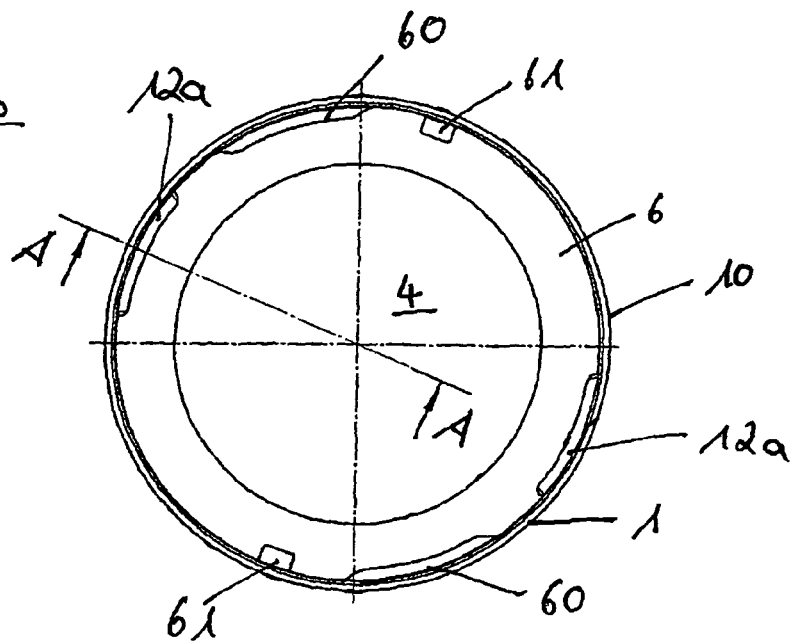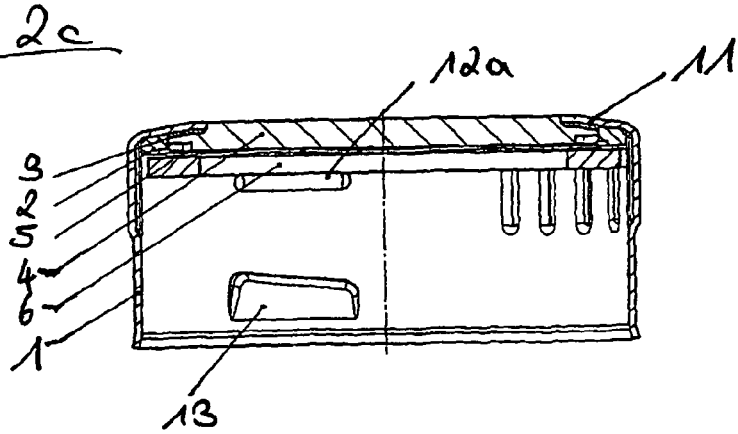

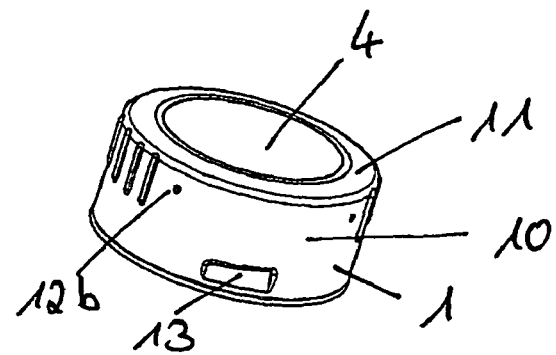
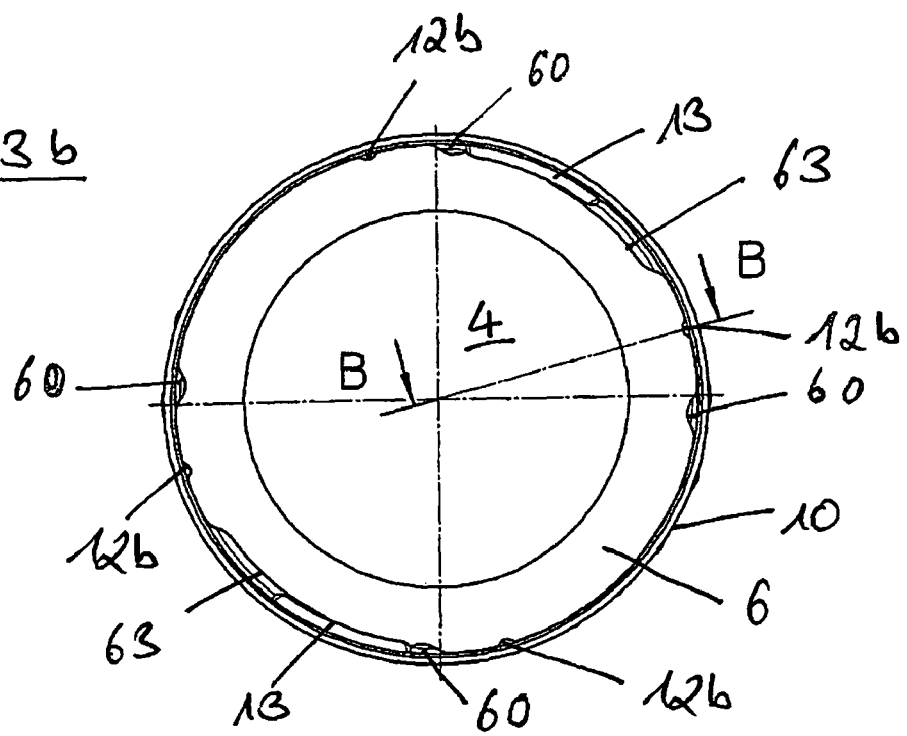
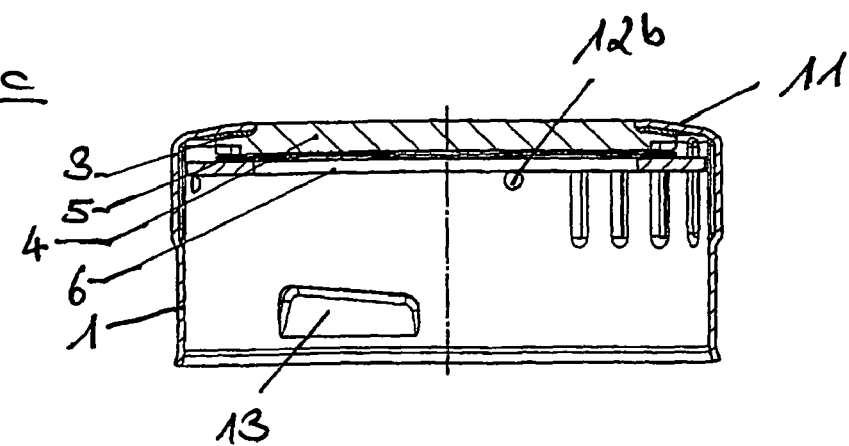

though the inspection glass is held in place by a bayonet fitting. A housing cover in which the inspection glass is held in place by a bayonet fitting is advantageous in that the housing cover can be manufactured as an aluminum die casting, a turned part of high-grade steel, or a plastic injection-molded part (as known to the prior art). In addition, however, it can be manufactured from a thinner material, for example, sheet metal.

LEVEL INDICATOR OR PRESSURE-MEASURING DEVICE WITH A CUP-SHAPED HOUSING COVER

This is a Non-Provisional Application of U.S. Provisional Patent Application Ser. No. 61/064,852, filed on Mar. 31, 2008, and claiming foreign priority to the European Patent Application Serial No. 08006229.2, filed on Mar. 31, 2008, the entire contents of which are hereby incorporated by reference in its entirety.

The invention relates to a level indicator or pressure-measuring device with a cup-shaped housing cover, in accordance with the preamble of patent claim 1.

Level indicators or pressure-measuring devices with a cup-shaped housing cover are known to the prior art. The housing covers for measuring devices of this kind have a lateral wall of cylindrical shape and an inspection glass that is secured to the bottom. These known housing covers are available in both a metal design and one composed of plastic parts. In the plastic version an inspection window, which is attached at the bottom of the housing cover, is injection-molded in the same process as the housing cover and is consequently secured to the housing cover. For the metal design, the prior art is acquainted with aluminum pressure die castings, as well as turned parts of high-grade steel. In both cases, the housing cover is designed so as to have a circumferential rim at its base for the inspection glass to rest on, while the inspection glass is held in place at the back by a snap ring inserted into a circumferential groove in the housing cover. This kind of fastening is only possible, however, when the lateral wall of the housing cover has a wall thickness great enough to support a groove. Manufacturing a housing cover of, e.g., sheet steel has not been possible till now due to the thinness of the housing wall and the associated deficiency with respect to the attachment of inspection glasses.

We now come to the present invention.

The goal of the invention is to further develop a cup-shaped housing cover with a cylindrical lateral wall and an inspection glass secured to its bottom, as intended for a level indicator or pressure-measuring device, and specifically in such a way that the housing cover may have thin housing walls consisting of, e.g., sheet metal.

This goal is achieved by a level indicator or pressure-measuring device with a cup-shaped housing cover with the features of patent claim 1.

Advantageous elaborations are the subject matter of the secondary claims.

A level indicator or pressure-measuring device in accordance with the invention has a cup-shaped housing cover with a cylindrical lateral wall and an inspection glass secured to bottom of the housing cover, such that the inspection glass is held in place by a bayonet fitting. A housing cover in which the inspection glass is held in place by a bayonet fitting is advantageous in that the housing cover can be manufactured as an aluminum die casting, a turned part of high-grade steel, or a plastic injection-molded part (as known to the prior art). In addition, however, it can be manufactured from a thinner material, for example, sheet metal.

In order to provide the inspection glass with a form-fitting design on the front side, as well as to firmly secure the bayonet fitting, it is advantageous if a spring configuration is positioned between the inspection glass and the bayonet fitting. This spring configuration may take the form, e.g., of an undulating circumferential elastic ring. This elastic ring ensures that the bayonet fitting and the inspection glass are subjected to an axial pressure while seated in the housing cover. In this way it is guaranteed that the inspection glass is pressed against the circumferential rim on the front side, while on the back side any loosening of the bayonet fitting due to vibration is prevented.

In an elaboration of the invention the housing cover is formed from a sheet metal, e.g., by deep-drawing. Manufacture of the housing cover from a sheet metal, e.g., a V2A sheet steel, has an advantage in that this kind of housing cover provides a surface that can be easily cleaned and that is corrosion-proof, as is urgently necessary in, e.g., the food or chemical industry. A housing cover that is produced from a sheet metal by deep-drawing has the further advantage of providing an appreciable savings in material, as compared to an injection-molded or a turned part.

In order to secure the inspection glass on a defined plane, it is advantageous if the base of the housing cover has a circumferential rim, to thereby provide a bearing surface for the inspection glass. A sealing element may also be provided between the inspection glass and the rim, so that a seal is guaranteed on the front side against the processing atmosphere. The sealing element can be, e.g., a circular O-ring or a shaped silicon seal.

In order to guarantee that the sealing element and/or the inspection glass has a centered alignment it is expedient if there is another centering ring which spaces the sealing element and/or the inspection glass in relation to the housing wall. A centering ring of this kind may also be designed so as to form a single part with the sealing element. It is preferably made of plastic.

For a housing cover that is made of sheet metal, it is advantageous if a bearing or support for the bayonet fitting is formed by at least two corrugations. As an alternative, it is also possible to provide a bearing for the bayonet fitting with beads positioned in linear fashion over a single plane. The bayonet fitting is formed by a tension ring that has release areas matching the corrugations or beads, and these release areas serve to permit the insertion of the tension ring. After the tension ring is rotated, it is fixed in position beneath the inwardly projecting corrugations or beads and thereby locks the bayonet fitting into place.

In order to ensure the easy rotation of the bayonet fitting upon assembly it is possible to provide additional recesses.

The invention is next explained in detail on the basis of two exemplary embodiments, with reference to the attached figures. Identical or functionally equivalent parts are furnished with identical reference symbols.

Shown are:

FIGS. 1a/1b an exploded drawing of the first exemplary embodiment of the housing cover according to the invention, from different perspectives FIG. 2a a perspective view of the exemplary embodiment of FIGS. 1a and 1b, in assembled condition FIG. 2b a bottom view of the housing cover of FIG. 2a FIG. 2c a section through the housing cover of FIG. 2b along line A-A FIG. 3a a perspective view of a second exemplary embodiment of a housing cover in assembled condition FIG. 3b a bottom view of the housing cover of FIG. 3a FIG. 3c a section through the housing cover of FIG. 3b along line B-B.

FIGS. 1a and 1b each give an exploded view of the inventive housing cover for a level indicator or pressure-measuring device, in different perspectives. The depictions are identical apart from the angle of view and are therefore explained in common.

Both figures show a cup-shaped housing cover 1 with a cylindrical side wall 10, which has a circumferential rim 11 at the bottom. The housing cover 1 is formed of sheet steel in a deep-drawing process; on the lateral wall 10 it exhibits two channel-like corrugations 12a that open into the housing interior and serve as bearings for a bayonet fitting. Also applied to the lateral wall 10 are two threaded gearings 13, which allow the housing cover 1 to be screwed onto a level indicator or a measuring device. FIGS. 1a and 1b also show, in order of assembly, a centering ring 2 and a sealing ring 3. The centering ring 2 is made of plastic and can be applied to the housing cover 1 so as to circumferentially space the sealing ring 3 at a distance from the lateral wall 10 and to align it against an inner edge of the circumferential rim 11. The sealing ring 3 is designed as a shaped silicon seal. In addition, the centering ring 2 is designed so that an inspection glass 4, which ideally will also be made of transparent plastic, is circumferentially spaced at a distance from the lateral wall 10 and comes to rest in the housing cover 1. On its front side the inspection glass 4 has a circumferential step 41, so as to create a circumferential rim 40 with a width equal to that of the shaped silicon seal 3, with the result that the rim 40 comes to rest on the silicon seal 3. The circumferential step 41 also ensures that when the housing cover 1 is in assembled condition the inspection glass 4 rests on an even plane with the housing cover 1. An elastic spring 5 comes to rest on the back side of the inspection glass 4, and when the bayonet fitting is realized the elastic spring 5 causes the inspection glass 4 to exert an axial pressure on the shaped silicon seal; at the same time, the elastic spring 5 prevents any rotation of the bayonet fitting caused by vibration. The actual bayonet fitting is formed by a tension ring 6. On its circumference, the tension ring 6 has two release areas 60, which match the corrugations 12a on the lateral wall of the housing cover 1, in order to permit the introduction of the tension ring 6 into the housing cover 1. In addition, there are two recesses 61 which serve as rotating aids in locking the bayonet fitting into place. During mounting of the housing cover 1, the tension ring 6 is inserted into the housing while under axial pressure in a pressing device and is rotated under pressure, so that the circumference of the tension ring 6 reaches a position beneath the corrugations 12a. When the pressure from the pressing device is removed during this state, the elastic ring 5 decompresses at least partially and maintains a tension between the inspection glass 4 and the tension ring 6, so that the inspection glass 4 is pressed against the fitted silicon seal 3 on the front side and an axially extending pressure is exerted by the tension ring on the corrugations 12a at the back side. The configuration is thus permanently under tension, which prevents any rotation of the bayonet fitting.

FIG. 2a gives a perspective view of the housing cover 1 just described, in its assembled state. In this depiction it can easily be seen that the inspection glass 4 terminates at the front in flush fashion with the rim 11 of the housing cover 1, whose upper side, as a result, is free of edges and gaps. Also easily seen in FIG. 2a is one of the corrugations 12a, which acts as a bearing 12 for the tension ring 6 inside the housing. Also evident is the corrugated thread 13 applied to the lateral wall 10.

FIG. 2b gives a bottom view of the housing cover 1 shown in FIG. 2a. In FIG. 2b the housing cover 1 is also shown in assembled condition, i.e., the tension ring 6 rests in rotated position in the housing cover 1, in contrast to its position during mounting. Particularly evident in FIG. 2b are the corrugations 12a, which project inwardly to serve as bearings. The circumferential rim of the tension ring 6 comes to rest under these corrugations 12a, and the bayonet fitting is thereby locked into place. Also evident in this bottom view are the release areas 60 in the circumference of the tension ring 6, which are designed to permit the introduction of the tension ring 6 across the corrugations 12a. The recesses 61 positioned on the circumference of the tension ring 6 can also be identified. A rotating tool engages with these recesses 61 during assembly, to make rotation of the tension ring 6 possible. Care must be taken upon mounting the tension ring 6 to ensure sufficient rotation, in order to thereby avoid any overlapping of the corrugations 12a with the release areas 60 when the terminal position is reached. In the exemplary embodiment that is depicted, this is accomplished with a clockwise rotation of 45° to 90°.

FIG. 2c provides a lateral view of a section through the housing cover 1 shown in FIG. 2b, along line A-A. In this depiction the flush fit of the circumferential rim 11 of the housing cover 1 and the inspection glass 4, with its stepped design, can again be seen with special clarity. In addition, FIG. 2c shows how the shaped silicon seal 3 and the inspection glass 4 are held at a distance from the circumferential lateral wall 10 by the centering ring 2 and are thereby centrally aligned. The elastic ring 5 is braced by the tension ring 6 after the latter's insertion and rotation, and consequently exerts a pressure in the lateral direction of the housing cover 1.

FIGS. 3a to 3c give the same views as FIGS. 2a to 2c for another exemplary embodiment of a housing cover for a level indicator or pressure-measuring device, as specified by the invention. In contrast to the exemplary embodiment depicted in FIGS. 2a to 2c, the bearing 12 for the bayonet fitting is formed by point-like corrugations or beads 12b. In the depicted embodiment, four point-like beads 12b are provided on the circumference of the lateral wall 10 of the housing 1, as can be easily seen in FIG. 3c. Here it is important that the beads 12b are distributed uniformly over the circumference of the lateral wall 10, since this will prevent the tension ring 6 from tipping. The tension ring 6 differs from that of the exemplary embodiment of FIGS. 2a to 2c in that there are no recesses 61 provided as rotating means for the tension ring 6. In addition to the release areas 60 for the bearings, however, the tension ring 6 has additional recesses 63, which are positioned in such a way that the tension ring 6 can be inserted into the housing cover 1 using the corrugated thread 13.

In FIG. 3c it is also evident that this exemplary embodiment does not provide a centering ring. The shaped silicon seal 3 and the viewing window 4 are aligned only by the step 41 provided in the viewing window 4.

LIST OF REFERENCE NUMERALS 1 housing
2 centering ring
3 sealing element
4 inspection glass
5 spring configuration/elastic ring
6 tension ring
10 lateral wall
11 rim
12 bearing
12a corrugation
12b bead
13 thread
40 rim
41 step
60 release area
61 recess
63 recess

The invention claimed is:

1. A cup shaped cover for a level indicator or pressure-measuring device, having a cylindrical lateral wall (10) and an inspection glass (4) fixed to the base, wherein the inspection glass (4) is fixed to the cover by a bayonet fitting.

2. Housing cover (1) according to claim 1, wherein a spring configuration (5) is provided between the bayonet fitting and the inspection glass (4).

3. Housing cover (1) according to claim 1, wherein the spring configuration is designed as an elastic ring (5).

4. Housing cover (1) according to claim 1, wherein the housing cover (1) is formed of sheet metal.

5. Housing cover (1) according to claim 4, wherein the housing cover (1) is produced by deep-drawing.

6. Housing cover (1) according to claim 1, wherein the housing cover (1) has a circumferential rim (11) that serves as a bearing surface for the inspection glass (4).

7. Housing cover (1) according to claim 6, wherein a sealing element (3) is provided between the inspection glass (4) and the rim (11).

8. Housing cover (1) according to claim 7, wherein the sealing element is a shaped silicon seal (3).

9. Housing cover (1) according to claim 7, wherein a centering ring (2) is provided for aligning the sealing element (3).

10. Housing cover (1) according to claim 4, wherein a bearing (12) for the bayonet fitting is formed by at least two corrugations (12*a*).

11. Housing cover (1) according to claim 4, wherein a bearing (12) for the bayonet fitting is formed by beads (12*b*) positioned in linear fashion.

12. Housing cover (1) according to claim 1, wherein the bayonet fitting is circular in design.

13. Housing cover (1) according to claim 1, wherein the bayonet fitting has additional recesses (61) which serve as a rotational aid.

* * * * *